US012308185B2

(12) United States Patent
Lai et al.

(10) Patent No.: US 12,308,185 B2
(45) Date of Patent: May 20, 2025

(54) KEYSWITCH STRUCTURE AND KEYBOARD THEREWITH

(71) Applicant: DARFON ELECTRONICS CORP., Taoyuan (TW)

(72) Inventors: Zheng-Hong Lai, Taoyuan (TW); Chih-Ho Hsu, Taoyuan (TW); Chin-Lung Chan, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 276 days.

(21) Appl. No.: 18/132,433

(22) Filed: Apr. 10, 2023

(65) Prior Publication Data

US 2023/0245843 A1 Aug. 3, 2023

Related U.S. Application Data

(63) Continuation of application No. 17/317,889, filed on May 12, 2021, now abandoned.

(30) Foreign Application Priority Data

Oct. 21, 2020 (TW) ................................ 109136369

(51) Int. Cl.
*H01H 13/705* (2006.01)
*H01H 13/83* (2006.01)

(52) U.S. Cl.
CPC .......... *H01H 13/705* (2013.01); *H01H 13/83* (2013.01); *H01H 2221/07* (2013.01); *H01H 2223/044* (2013.01)

(58) Field of Classification Search
CPC .. H01H 13/705; H01H 13/83; H01H 2221/07; H01H 2223/044; H01H 13/02;
(Continued)

(56) References Cited

U.S. PATENT DOCUMENTS 4,109,118 A * 8/1978 Kley ..................... H01H 13/74
200/5 E
4,471,189 A 9/1984 Bacon
(Continued)

FOREIGN PATENT DOCUMENTS

CN 103660661 A 3/2014
CN 204144117 U 2/2015
(Continued)

*Primary Examiner* — Edwin A. Leon
(74) *Attorney, Agent, or Firm* — Winston Hsu

(57) ABSTRACT

A keyswitch structure includes a switch and a multilayer structure above the switch. The multilayer structure includes an inner flexible layer, a rigid light-transmissive cover sheet, and a flexible light-transmissive layer. The inner flexible layer has a keycap portion and a connection portion extending outward from the keycap portion. The keycap portion is located above the switch and forms a spatial character structure. The rigid light-transmissive cover sheet is disposed on the keycap portion and covers the spatial character structure. The flexible light-transmissive layer covers the inner flexible layer and the rigid light-transmissive cover sheet. A keyboard includes the keyswitch structure and a device casing carrying the keyswitch structure. The multilayer structure is fixed to the device casing. The rigid light-transmissive cover sheet is harder than the flexible light-transmissive layer and structurally protects the spatial character structure from being damaged when the keyswitch structure is pressed.

20 Claims, 13 Drawing Sheets

(58) Field of Classification Search

CPC .......... H01H 13/86; H01H 13/06; H01H 9/18; H01H 13/704; H01H 2209/00; H01H 2227/00; H01H 2219/00

USPC ................................. 200/5 A, 313, 314, 512

See application file for complete search history.

(56) References Cited

U.S. PATENT DOCUMENTS

| | | | | |
|---|---|---|---|---|
| 4,772,769 | A * | 9/1988 | Shumate | G06F 3/0202 200/317 |
| 5,021,638 | A | 6/1991 | Nopper | |
| 5,362,934 | A | 11/1994 | Inagaki | |
| 6,635,838 | B1 | 10/2003 | Kornelson | |
| 6,705,787 | B2 | 3/2004 | Jeffries | |
| 7,075,024 | B2 | 7/2006 | Maeda | |
| 8,735,748 | B2 | 5/2014 | Yamada | |
| 10,590,600 | B1 | 3/2020 | Wang | |
| 2007/0199804 | A1* | 8/2007 | Joseph | H01H 13/705 200/5 A |
| 2010/0213043 | A1* | 8/2010 | Chen | H01H 13/83 200/5 A |
| 2010/0232861 | A1 | 9/2010 | Shibata | |
| 2012/0161988 | A1 | 6/2012 | Chang | |
| 2013/0233686 | A1* | 9/2013 | Zhou | H01H 13/7073 267/158 |
| 2014/0341630 | A1* | 11/2014 | Bedolla | G06F 3/0219 400/490 |
| 2016/0042890 | A1 | 2/2016 | Lin | |
| 2018/0218859 | A1 | 8/2018 | Ligtenberg | |
| 2018/0323021 | A1 | 11/2018 | Lai | |
| 2020/0089328 | A1* | 3/2020 | Wang | G06F 3/023 |

FOREIGN PATENT DOCUMENTS

| | | | |
|---|---|---|---|
| CN | 102119431 | B | 5/2015 |
| CN | 107068463 | A | 8/2017 |
| CN | 209045400 | U | 6/2019 |
| CN | 110392500 | A | 10/2019 |
| JP | 2002216575 | A | 8/2002 |
| TW | 1320900 | B | 2/2010 |
| TW | M404421 | U1 | 5/2011 |
| TW | 201628037 | A | 8/2016 |
| TW | 1559176 | B | 11/2016 |
| TW | 1610324 | B | 1/2018 |
| TW | 1615876 | B | 2/2018 |
| TW | 201903799 | A | 1/2019 |
| TW | 1720757 | B | 3/2021 |

* cited by examiner

KEYSWITCH STRUCTURE AND KEYBOARD THEREWITH

CROSS REFERENCE TO RELATED APPLICATIONS

This application is a continuation application of U.S. application Ser. No. 17/317,889, filed on May 12, 2021. The content of the application is incorporated herein by reference.

BACKGROUND OF THE INVENTION

1. Field of the Invention

The present invention relates to a keyswitch structure and a keyboard, and more particularly to a keyswitch structure with protective outer layer and a keyboard with the keyswitch structure.

2. Description of the Prior Art

Common keyboards have a plurality of keycaps for users to press for input. The keycap usually has some characters (including text, symbols, and so on) thereon, for users to recognize and press the keycap quickly and correctly. The Characters can be formed by printing, engraving, hollowed-out layered structures, etc., and have a spatial structure. When a finger touches and presses the keycap, the finger may rub the characters. After long-term rubbing, the characters may be damaged or even disappear. Some keyboards have a protective outer layer that covers all keycaps. However, when the finger touches and presses the protective outer layer corresponding to the keycap to be pressed, the portion of the protective outer layer may still rub the characters on the keycap. Similarly, after long-term rubbing, the characters will still be damaged or even disappear.

SUMMARY OF THE INVENTION

An objective of the invention is to provide a keyswitch structure, which uses a rigid light-transmissive cover sheet to cover a character structure to protect the character structure.

A keyswitch structure according to the invention includes a switch and a multilayer structure disposed above the switch. The multilayer structure includes an inner flexible layer, a rigid light-transmissive cover sheet, and a flexible light-transmissive layer. The inner flexible layer has a keycap portion and a connection portion extending outward from the keycap portion. The keycap portion is located above the switch and forms a spatial character structure. The rigid light-transmissive cover sheet is disposed on the keycap portion and covers the spatial character structure. The flexible light-transmissive layer covers the inner flexible layer and the rigid light-transmissive cover sheet. Therein, the inner flexible layer has an inner skirt portion. The flexible light-transmissive layer has an outer skirt portion. Both of the inner skirt portion and the outer skirt portion surround at least two opposite sides of the first rigid light-transmissive cover sheet. Both of the inner skirt portion and the outer skirt portion extend downward with the outer skirt portion covering the inner skirt portion. Thereby, the rigid light-transmissive cover sheet can protect spatial character structure from structural damage caused by rubbing when the flexible light-transmissive layer is pressed by a finger of a user.

An objective of the invention is to provide a keyboard, which includes the above keyswitch structure and therefore can use the rigid light-transmissive cover sheet to protect the character structure.

A keyboard according to the invention includes a keyswitch structure and a device casing carrying the keyswitch structure. The keyswitch structure includes a switch and a multilayer structure disposed above the switch. The multilayer structure is fixed to the device casing and includes an inner flexible layer, a rigid light-transmissive cover sheet, and a flexible light-transmissive layer. The inner flexible layer has a keycap portion and a connection portion extending outward from the keycap portion. The keycap portion is located above the switch and forms a spatial character structure. The rigid light-transmissive cover sheet is disposed on the keycap portion and covers the spatial character structure. The flexible light-transmissive layer covers the inner flexible layer and the rigid light-transmissive cover sheet. Therein, the inner flexible layer has an inner skirt portion. The flexible light-transmissive layer has an outer skirt portion. Both of the inner skirt portion and the outer skirt portion surround at least two opposite sides of the first rigid light-transmissive cover sheet. Both of the inner skirt portion and the outer skirt portion extend downward with the outer skirt portion covering the inner skirt portion. Similarly, the rigid light-transmissive cover sheet can protect spatial character structure from structural damage caused by rubbing when the flexible light-transmissive layer is pressed by a finger of a user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
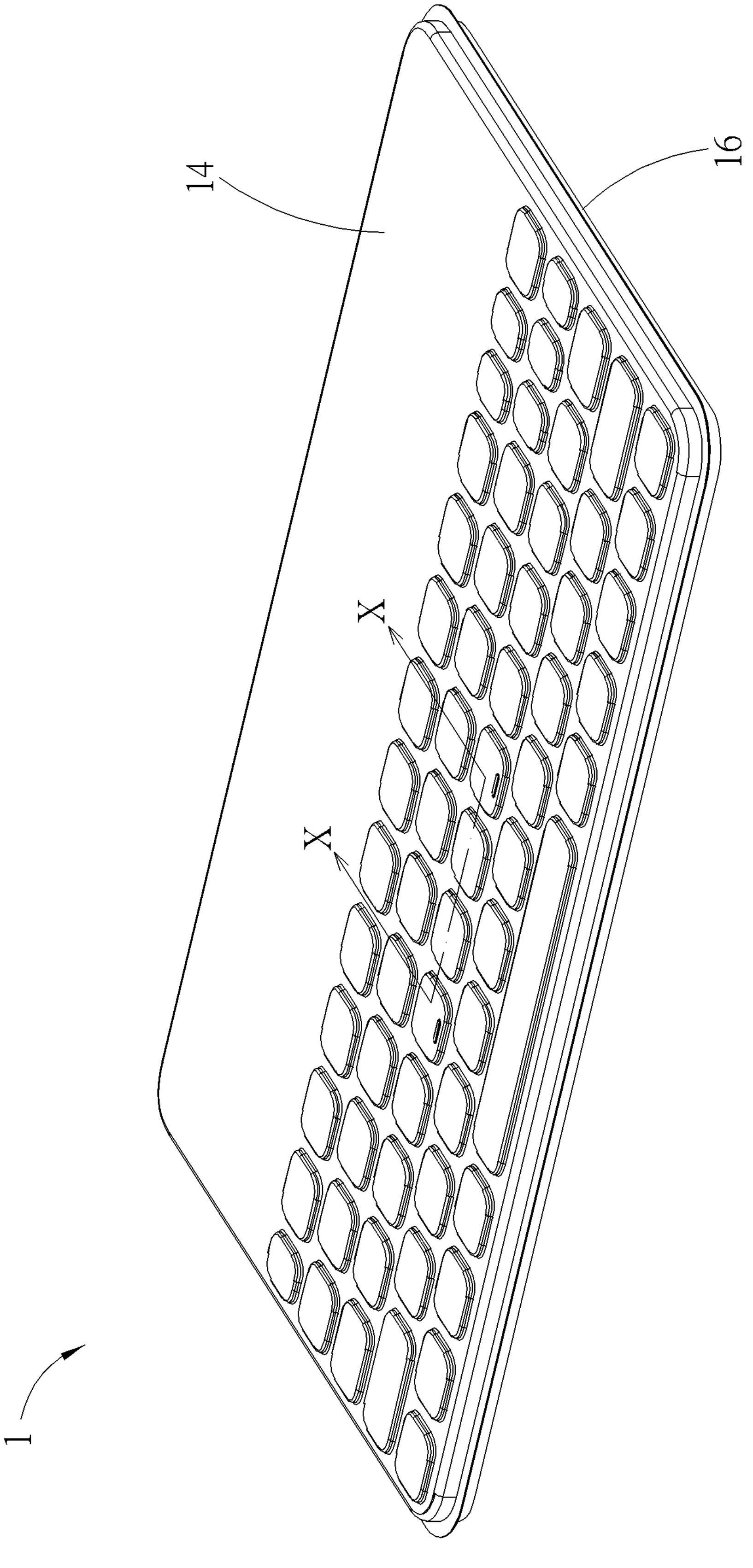
FIG. 1 is schematic diagram illustrating a keyboard according to a first embodiment.

Please refer to FIG. 1 to FIG. 4. A keyboard 1 according to a first embodiment includes a keyboard body 12, a multilayer structure 14, and a lower flexible layer 16. The multilayer structure 14 and the lower flexible layer 16 are disposed on the upper and lower sides of the keyboard body 12 respectively and are joined to completely encapsulate the keyboard body 12 to produce waterproof and dustproof effects. The multilayer structure 14 is flexible, so that users can implement input operations on the keyboard body 12 by pressing the multilayer structure 14.

The keyboard body 12 includes a device casing 122, and a bottom plate 124, a plurality of keycaps (including a first keycap 126*a* and a second keycap 126*b*), a plurality of lift mechanisms (including a first lift mechanism 128*a* and a second lift mechanism 128*b*), a switch circuit board 130, and a plurality of resilient restoration parts (including a first resilient restoration part 132*a* and a second resilient restoration part 132*b*) which are carried by the device casing 122. The device casing 122 includes an upper casing 1222 and a lower casing 1224. The upper casing 1222 and the lower casing 1224 are connected to form an accommodating space 122*a*. The bottom plate 124 is placed on the lower casing 1224 in the accommodating space 122*a*. The plurality of keycaps are disposed above the bottom plate 124 and exposed from the upper casing 1222. The plurality of lift mechanisms are connected to and between the keycaps and the bottom plate 124, so that the plurality of keycaps can move up and down relative to the bottom plate 124 in a vertical direction Dv (indicated by a double-headed arrow). Each keycap corresponds to one lift mechanism, e.g., scissors supports, butterfly supports, or other mechanisms capable of moving the corresponding keycap up and down. In practice, the lift mechanism of the longer keycaps (such as the space bar, the enter key, the backspace key, the shift key) can be achieved by a plurality of scissors supports, butterfly supports, or a combination thereof. The switch circuit board 130 is placed on the bottom plate 124 in the accommodating space 122*a* and has a plurality of switches (including a first switch 130*a* and a second switch 130*b*). Each switch corresponds to one keycap. In practice, the longer keycap can correspond to multiple switches. The plurality of resilient restoration parts are disposed between the plurality of keycaps and the bottom plate 124 in the accommodating space 122*a*. Each resilient restoration part corresponds to one keycap. In practice, the longer keycap can correspond to multiple resilient restoration parts. The resilient restoration part can be squeezed (e.g. by the corresponding downwardly moving keycap) to elastically deform. The resilience of the squeezed resilient restoration part can drive the corresponding keycap to move upward and return to its original position.

Therein, the upper casing 1222 is a structural frame. The first keycap 126*a* is located above the first switch 130*a* and exposed from a first window 1222*a* of the upper casing 1222 (which communicates with the accommodating space 122*a*). The first lift mechanism 128*a* is connected to and between the first keycap 126*a* and the bottom plate 124. The first resilient restoration part 132*a* is located between the first keycap 126*a* and the first switch 130*a*. When the first keycap 126*a* moves toward the first switch 130*a* in the vertical direction Dv (e.g., by a user pressing the first keycap 126*a* through the multilayer structure 14), the first keycap 126*a* squeezes the first resilient restoration part 132*a* to trigger the first switch 130*a*. When the first keycap 126*a* is no longer pressed, the first resilient restoration part 132*a* will rebound to drive the first keycap 126*a* to move upward and return to its original position. Similarly, the second keycap 126*b* is located above the second switch 130*b* and exposed from a second window 1222*b* of the upper casing 1222 (which communicates with the accommodating space 122*a*). The second lift mechanism 128*b* is connected to and between the second keycap 126*b* and the bottom plate 124. The second resilient restoration part 132*b* is located between the second keycap 126*b* and the second switch 130*b*. When the second keycap 126*b* moves toward the second switch 130*b* in the vertical direction Dv, the second keycap 126*b* squeezes the second resilient restoration part 132*b* to trigger the second switch 130*b*. When the second keycap 126*b* is no longer pressed, the second resilient restoration part 132*b* will rebound to drive the second keycap 126*b* to move upward and return to its original position. Furthermore, in the first embodiment, the projection of the first keycap portion 1422 of the multilayer structure 14 (in which the first keycap portion 1422 is the portion of the inner flexible layer 142 corresponding to the first keycap 126*a*) on the upper casing 1222 in the vertical direction Dv is within the first window 1222*a*. The projection of the second keycap portion 1424 of the multilayer structure 14 (in which the second keycap portion 1424 is the portion of the inner flexible layer 142 corresponding to the second keycap 126*b*) on the upper casing 1222 in the vertical direction Dv is within the second window 1222*b*.

Furthermore, in the first embodiment, the switch circuit board 130 is achieved by a membrane circuit board which includes an upper circuit substrate, a lower circuit substrate, and an intermediate insulation sheet disposed between the upper circuit substrate and the lower circuit substrate. The switch is achieved by contacts oppositely disposed on the upper circuit substrate and the lower circuit substrate; for simplification of drawing, the switch is shown by a single block in the figures. In practice, the switch circuit board 130 may also be achieved by other structures, e.g., disposing a tactile switch on a printed circuit board or flexible circuit board. For another example, opposite contacts are formed on a circuit board as a switch. The resilient restoration part has a conductive portion, so that when the resilient restoration part is squeezed downward, the conductive portion can conduct the contacts. In addition, in practice, the switch may be triggered by other structures. For example, in the view point of FIG. 4, the first switch 130*a* is offset from the middle (so as not to be covered by the first resilient restoration part 132*a*). The first keycap 126*a* has a downward protrusion corresponding to the first switch 130*a*, so that when the first keycap 126*a* moves downward, the protrusion can trigger the first switch 130*a*. For another example, the protrusion in the above example may be disposed on the first lift mechanism 128*a* (e.g., one of the supports of the scissors support) alternatively, so that when the first keycap 126*a* moves downward, the first keycap 126*a* drives the first lift mechanism 128*a* to fold so as to make the protrusion trigger the first switch 130*a*.

Figure 3:
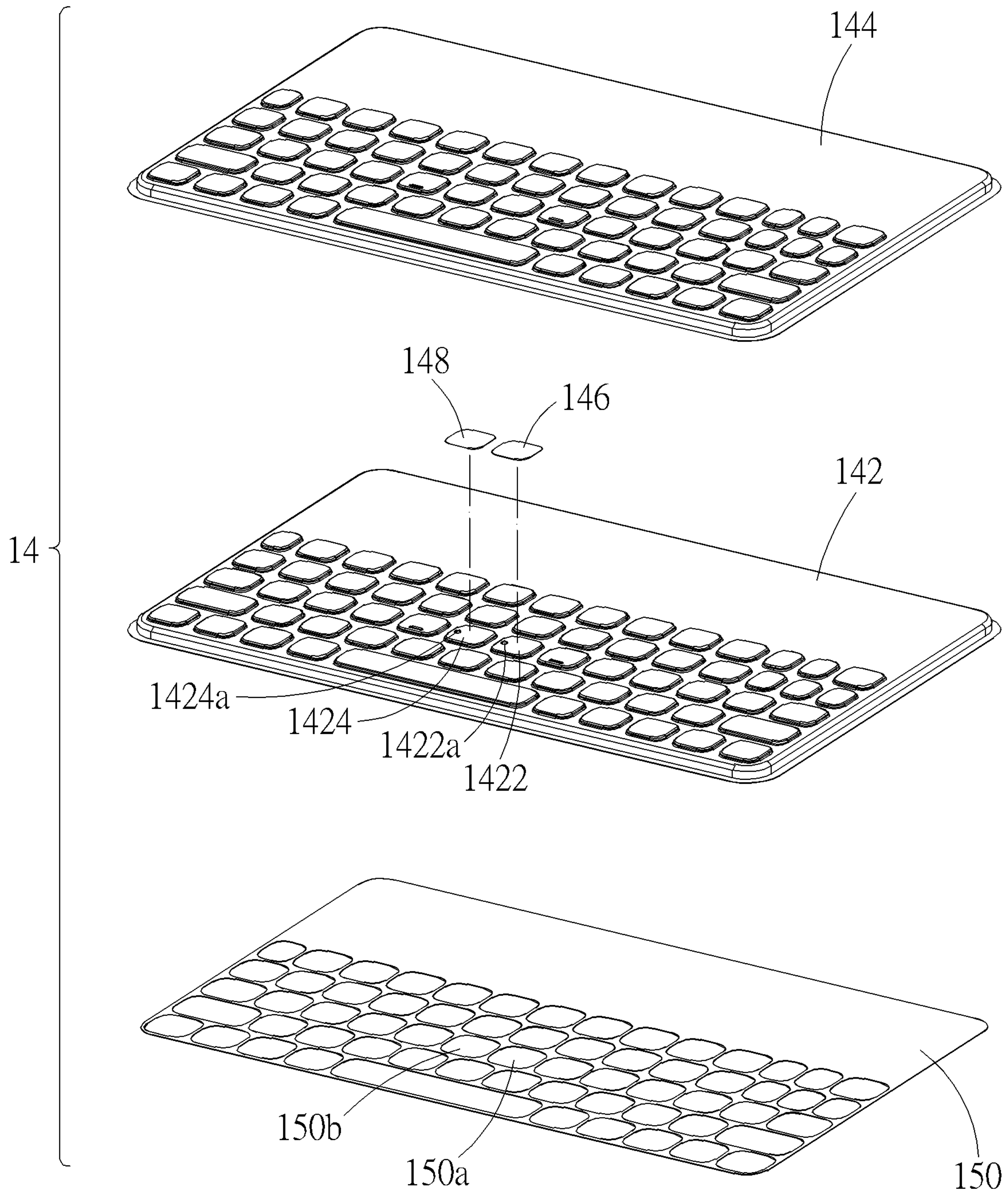
FIG. 3 is an exploded view of a multilayer structure in FIG. 2.
Figure 4:
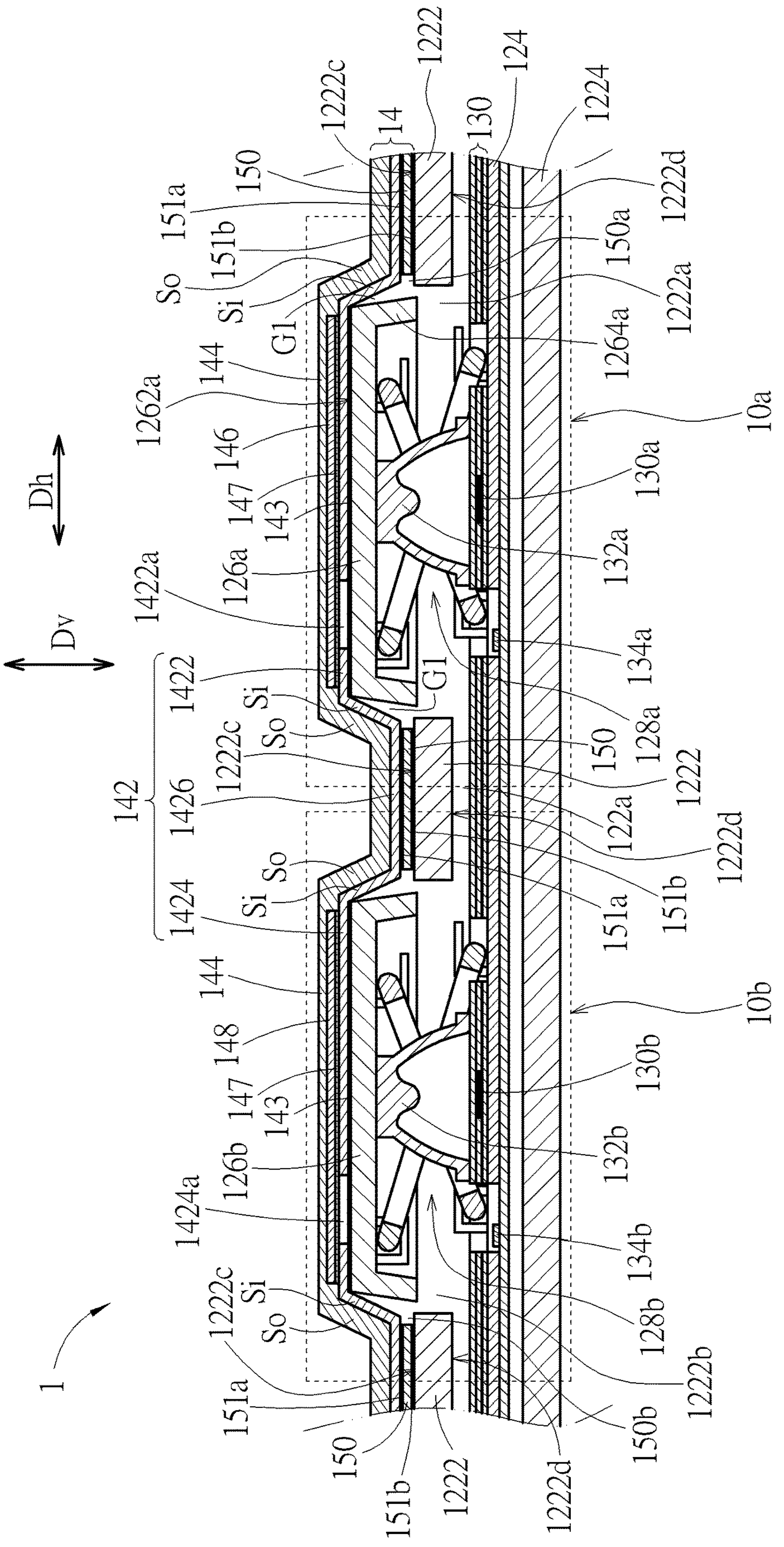
FIG. 4 is a sectional view of the keyboard in FIG. 1 along the line X-X.

As shown by FIG. 3 and FIG. 4, the multilayer structure 14 includes an inner flexible layer 142, a flexible light-transmissive layer 144 stacked on the inner flexible layer 142, and a first rigid light-transmissive cover sheet 146 and a second rigid light-transmissive cover sheet 148 which are stacked between the inner flexible layer 142 and the flexible light-transmissive layer 144. The rigidity of the first rigid light-transmissive cover sheet 146 and the second rigid light-transmissive cover sheet 148 is greater than that of the inner flexible layer 142. The inner flexible layer 142 has a first keycap portion 1422, a second keycap portion 1424, and a connection portion 1426 which directly connects the first keycap portion 1422 and the second keycap portion 1424. In structural logic, the connection portion 1426 can be considered to extend outward from the first keycap portion 1422

(relative to the first keycap portion 1422) and can be considered to also extend outward from the second keycap portion 1424 (relative to the second keycap portion 1424). Furthermore, in the first embodiment, the connection portion 1426 surrounds the first keycap portion 1422 and the second keycap portion 1424 (as shown by FIG. 3). The first keycap portion 1422 covers the first keycap 126*a* (i.e., located above the first switch 130*a*) and forms a first spatial character structure 1422*a*; the second keycap portion 1424 covers the second keycap 126*b* (i.e., located above the second switch 130*b*) and forms a second spatial character structure 1424*a*. Therein, the first spatial character structure 1422*a* and the second spatial character structure 1424*a* are represented by round holes for simplification of drawing. The first rigid light-transmissive cover sheet 146 is disposed above the first keycap portion 1422 and covers the first spatial character structure 1422*a*. The second rigid light-transmissive cover sheet 148 is disposed on the second keycap portion 1424 and covers the second spatial character structure 1424*a*. The flexible light-transmissive layer 144 covers the inner flexible layer 142, the first rigid light-transmissive cover sheet 146, and the second rigid light-transmissive cover sheet 148. Furthermore, from another point of view, for the single-key keyswitch structure 10*a* for example, the inner flexible layer 142 has an inner skirt portion Si. The flexible light-transmissive layer 144 has an outer skirt portion So. Both of the inner skirt portion Si and the outer skirt portion So surround at least two opposite sides of the first rigid light-transmissive cover sheet 146. Both of the inner skirt portion Si and the outer skirt portion So extend downward with the outer skirt portion So covering the inner skirt portion Si.

Thereby, when the user presses the first keycap 126*a*, the user's finger actually touches the portion of the multilayer structure 14 (or the flexible light-transmissive layer 144) corresponding to the first keycap 126*a*. Even during the pressing process, the finger may rub the multilayer structure 14. Under the protection of the first rigid light-transmitting cover sheet 146, the first spatial character structure 1422*a* will not be affected by the rubbing of the finger, at least reducing structural damage to the first spatial character structure 1422*a* (including structural deformation of the first spatial character structure 1422*a*) caused by rubbing of the finger. Similarly, the second rigid light-transmissive cover sheet 148 also has the same protective effect on the second spatial character structure 1424*a*, which will not be repeated. In addition, for simplification of drawing and description, the first embodiment is based on that the first keycap 126*a* and the second keycap 126*b* have the first spatial character structure 1422*a* and the second spatial character structure 1424*a* respectively; however, it is not limited thereto in practice. For example, the multilayer structure 14 may has a spatial character structure and a corresponding rigid light-transmissive cover sheet for each keycap, which will not described in addition.

Figure 5:
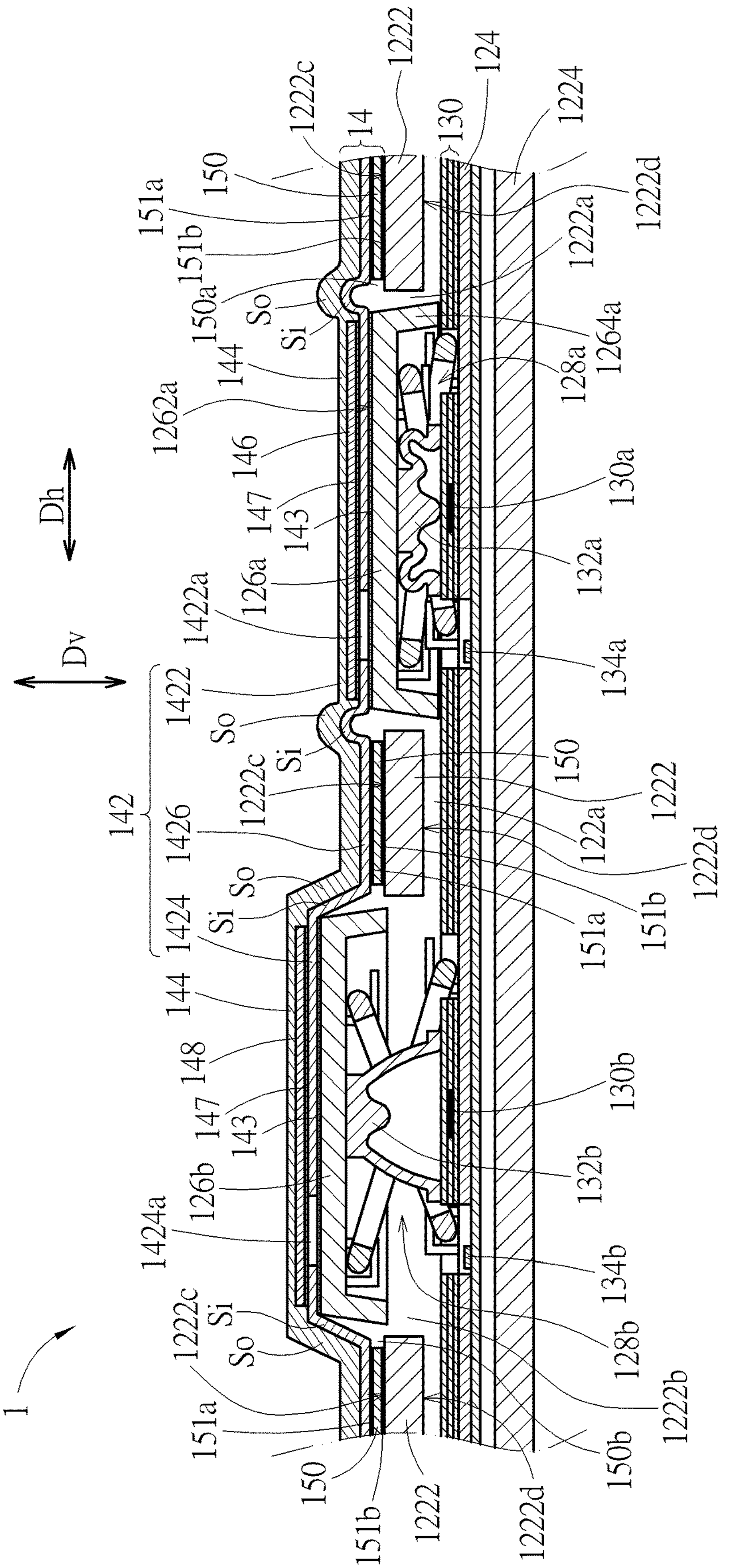
FIG. 5 is a sectional view of the keyboard in FIG. 4 when a first keycap thereof is pressed.

Furthermore, as shown by FIG. 2 to FIG. 5, in the first embodiment, the first keycap 126*a* has a horizontal keycap surface 1262*a*. The first keycap portion 1422 is fixed on the horizontal keycap surface 1262*a*. The projection of the first rigid light-transmissive cover sheet 146 on the first keycap 126*a* in the vertical direction Dv is within the horizontal keycap surface 1262*a*; that is, the first rigid light-transmissive cover sheet 146 is smaller than the horizontal keycap surface 1262*a*. In practice, the outer diameter of the first rigid light-transmissive cover sheet 146 can be designed to be smaller than the outer diameter of the horizontal keycap surface 1262*a* by about 0.4 mm, that is, 0.2 mm on one side. It can meet most of the assembly tolerance requirements, so that after the multilayer structure 14 is assembled to the keyboard body 12, the first rigid light-transmissive cover sheet 146 can effectively fall into the horizontal keycap surface 1262*a*, avoiding the first rigid light-transmissive cover sheet 146 from protruding from the horizontal keycap surface 1262*a* in a horizontal direction Dh (indicated by a double-headed arrow in the figures, which is perpendicular to the vertical direction Dv) to affect the user's pressing feeling. The first keycap 126*a* also has a keycap fringe 1264*a* which bends downward and extends from the horizontal keycap surface 1262*a*. The multilayer structure 14 (or the inner flexible layer 142 thereof) and the keycap fringe 1264*a* are separable, so that when the first keycap 126*a* is pressed, the multilayer structure 14 can be smoothly and elastically deformed and will not cause excessive pulling on the first keycap 126*a* and affect the up and down movement of the first keycap 126*a*, as shown by FIG. 5. Therein, when the first keycap 126*a* is pressed, the corresponding inner skirt portion Si and the corresponding outer skirt portion So remain stacked and bend together. Furthermore, in the first embodiment, when the first keycap 126*a* is not pressed yet, there is a gap G1 between the first keycap portion 1422 and the keycap fringe 1264*a* in the horizontal direction Dh.

Figure 2:
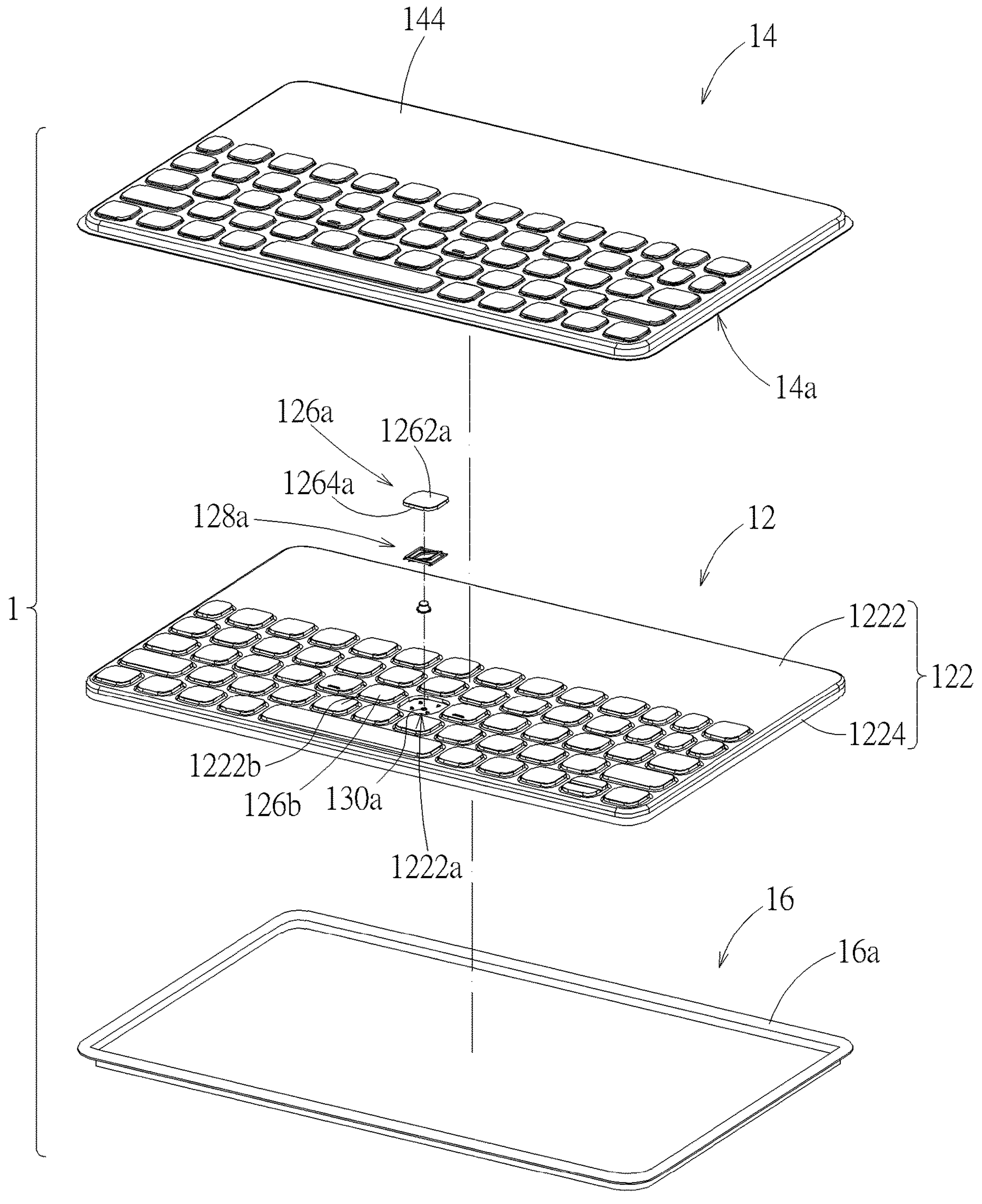
FIG. 2 is a partially-exploded view of the keyboard in FIG. 1.

Furthermore, as shown by FIG. 2 to FIG. 4, the multilayer structure 14 is located above the upper casing 1222 and fixed to an outer surface 1222*c* of the upper casing 1222. The lower flexible layer 16 is located under the lower casing 1224. The periphery 14*a* of the multilayer structure 14 and the periphery 16*a* of the lower flexible layer 16 are joined (for example, but not limited to by glue) to encapsulate the device casing 122. Moreover, in the first embodiment, the multilayer structure 14 also includes a rigid frame sheet 150. The inner flexible layer 142 is stacked on the rigid frame sheet 150, for example, but not limited to by combining the both with an adhesive layer 151*a* (only shown in FIG. 4 and FIG. 5 for simplification of drawing). The multilayer structure 14 is fixed to the upper casing 1222 through the rigid frame sheet 150 (for example, but not limited to by combining the both with an adhesive layer 151*b*, only shown in FIG. 4 and FIG. 5 for simplification of drawing). Therein, the rigid frame sheet 150 has a first through hole 150*a* and a second through hole 150*b*. The connection portion 1426 is fixed on the rigid frame sheet 150. The rigid frame sheet 150 has a greater rigidity than the inner flexible layer 142 and the flexible light-transmissive layer 144, so the structural rigidity of the multilayer structure 14 is increased. The projection of the first keycap portion 1422 on the rigid frame sheet 150 in the vertical direction Dv is within the first through hole 150*a*. The projection of the second keycap portion 1424 on the rigid frame sheet 150 in the vertical direction Dv is within the second through hole 150*b*. Thereby, when the first keycap 126*a* is pressed, the multilayer structure 14 can be smoothly and elastically deformed; the same is true for the second keycap 126*b*, which will not be described in addition.

Furthermore, in the first embodiment, the inner flexible layer 142 is made of an opaque material, for example but not limited to woven fabrics, thermoplastic polyurethanes (TPU), polyurethane (PU) and so on. The first spatial character structure 1422*a* is a holed structure. The first keycap 126*a* is light-transmissive; for example, the entire first keycap 126*a* may be made of a light-transmissive material, or only the portion of the first keycap 126*a* corresponding to the holed structure is light-transmissive. The keyboard body 12 includes a light source 134*a* (or referred to as a first light source 134*a*), disposed under the first keycap 126*a* corresponding to the first spatial character structure 1422*a*. Light emitted by the light source 134*a* can travel upward to pass through the first keycap 126*a*, the first spatial character structure 1422*a*, the first rigid light-transmissive cover sheet 146, and the flexible light-transmissive layer 144 to be emitted from the multilayer structure 14, which can provide the user with a visual effect. Similarly, the second spatial character structure 1424*a* may also be a holed structure. The second keycap 126*b* may light-transmissive. The keyboard body 12 includes another light source 134*b* (or referred to as a second light source 134*b*), disposed under the second keycap 126*b* corresponding to the second spatial character structure 1424*a*. Light emitted by the light source 134*b* can travel upward to pass through the second keycap 126*b*, the second spatial character structure 1424*a*, the second rigid light-transmissive cover sheet 148, and the flexible light-transmissive layer 144 to be emitted from the multilayer structure 14, which can provide the user with visual effects. The first and second light sources 134*a* and 134*b* (for example but not limited to light-emitting diodes) are disposed on a printed circuit board or flexible circuit board under the bottom plate 124. Therein, in order to enable the light emitted by the first and second light sources 134*a* and 134*b* to travel upward, the bottom plate 124 forms holes corresponding to the light sources 134*a* and 134*b*. In practice, the light sources 134*a* and 134*b* may also be integrated onto the switch circuit board 130. In addition, if the first and second resilient restoration parts 132*a* and 132*b* covers the first and second light sources 134*a* and 134*b*, the first and second resilient restoration parts 132*a* and 132*b* may be made of a light-transmissive material, for example but not limited to light-transmissive rubber domes.

Furthermore, in practice, the profile of the first spatial character structure 1422*a* may be text, symbols, numbers, graphics, etc. The second spatial character structure 1424*a* may also be the same, which will not be repeated. In addition, in practice, the first spatial character structure 1422*a* is not limited to provide the user with a visual effect through light transmission. For example, the first spatial character structure 1422*a* is achieved by a recess in which a light reflective material is disposed. For this instance, the first keycap 126*a* does not need to be light transmissive; therein, the recess may be formed by the first keycap portion 1422 alone (e.g. by embossing the first keycap portion 1422), or may be formed jointly by the first keycap 126*a* (or the horizontal keycap surface 1262*a* thereof) and the opening formed by the first keycap portion 1422. In addition, the inner flexible layer 142 is opaque and therefore can be used as a light-blocking layer which blocks light (from the light sources 134*a* and 134*b*) escaping from the periphery of the first keycap 126*a* and the second keycap 126*b*.

In the first embodiment, the first keycap portion 1422 is fixed on the horizontal keycap surface 1262*a* by means of glue (for example but not limited to an adhesive layer 143). The connection portion 1426 is also fixed on the rigid frame sheet 150 by means of glue (i.e., by the adhesive layer 151*a*). The first rigid light-transmissive cover sheet 146 is also fixed on the first keycap portion 1422 by means of glue (for example but not limited to an adhesive layer 147). Therein, the above adhesive layers 143, 147, 151*a* and 151*b* are shown only in FIG. 4 and FIG. 5 for simplification of drawing; however, it is not limited thereto. For example, the first rigid light-transmissive cover sheet 146 (and the second rigid light-transmissive cover sheet 148) can be effectively fixed through the combination of the flexible light-transmissive layer 144 and the inner flexible layer 142. The flexible light-transmissive layer 144 may be but not limited to light-transmissive silicone. The first rigid light-transmissive cover sheet 146, the second rigid light-transmissive cover sheet 148, and the rigid frame sheet 150 may be but not limited to polyethylene terephthalate (PET), polycarbonate (PC), FR4 epoxy glass fibers, etc. The adhesive layers 143 and 147 also use appropriate materials as needed (for example, light transmission is required).

In addition, in the first embodiment, the keyboard 1 includes a plurality of keycaps, and thus the structure of the keyboard 1 is multiple keyswitch structures. In logic, one keycap and the corresponding structure can be regarded as a single-key keyswitch structure, e.g. the single-key keyswitch structures 10*a* and 10*b* indicated by dashed frames in FIG. 4. The combination of the both can be regarded as a double-key keyswitch structure. In practice, the above single-key keyswitch structures 10*a* and 10*b* or the double-key keyswitch structure can also be applied to other applications, e.g. button switches, keys or buttons on the device control panel, etc. The description of the variants of keyboard 1 in the specification also applies herein, and will not be repeated in addition. It is noticed that in the keyboard 1, the structural frame is used directly as the upper casing 1222. The structural frame is contained in the device casing 122 and becomes a part of the device housing 122. However, it is not limited thereto. In practice, the structural frame may not be contained in the device casing 122, and is not a part of the device housing 122; that is, the portions of the upper casing 1222 inside the dashed frames in FIG. 4 are not regarded as a part of the device casing 122. Correspondingly, the multilayer structure 14 is fixed to the structural frame. The structural frame has a first window and a second window. The projection of the first keycap portion 1422 on the structural frame in the vertical direction Dv is within the first window. The projection of the second keycap portion 1424 on the structural frame in the vertical direction Dv is within the second window.

Figure 6:
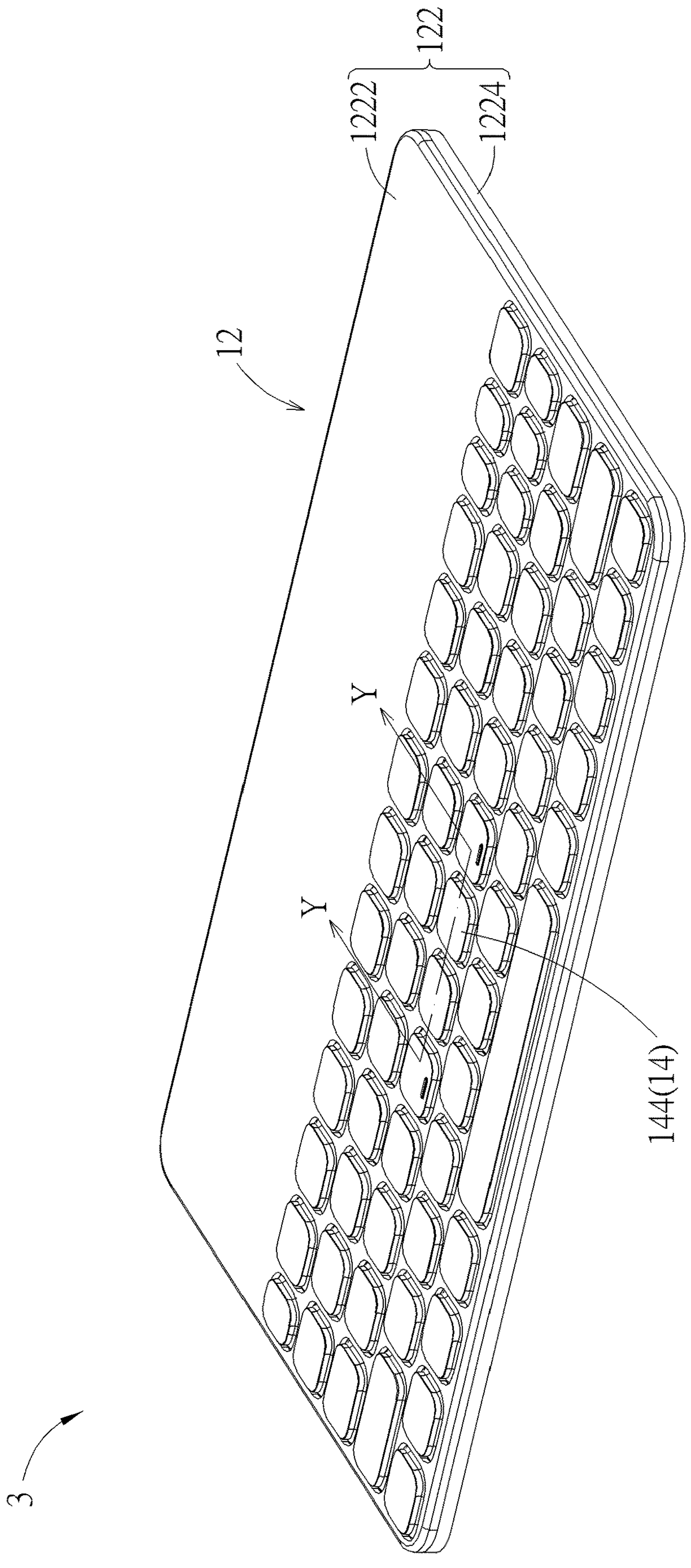
FIG. 6 is schematic diagram illustrating a keyboard according to a second embodiment.
Figure 7:
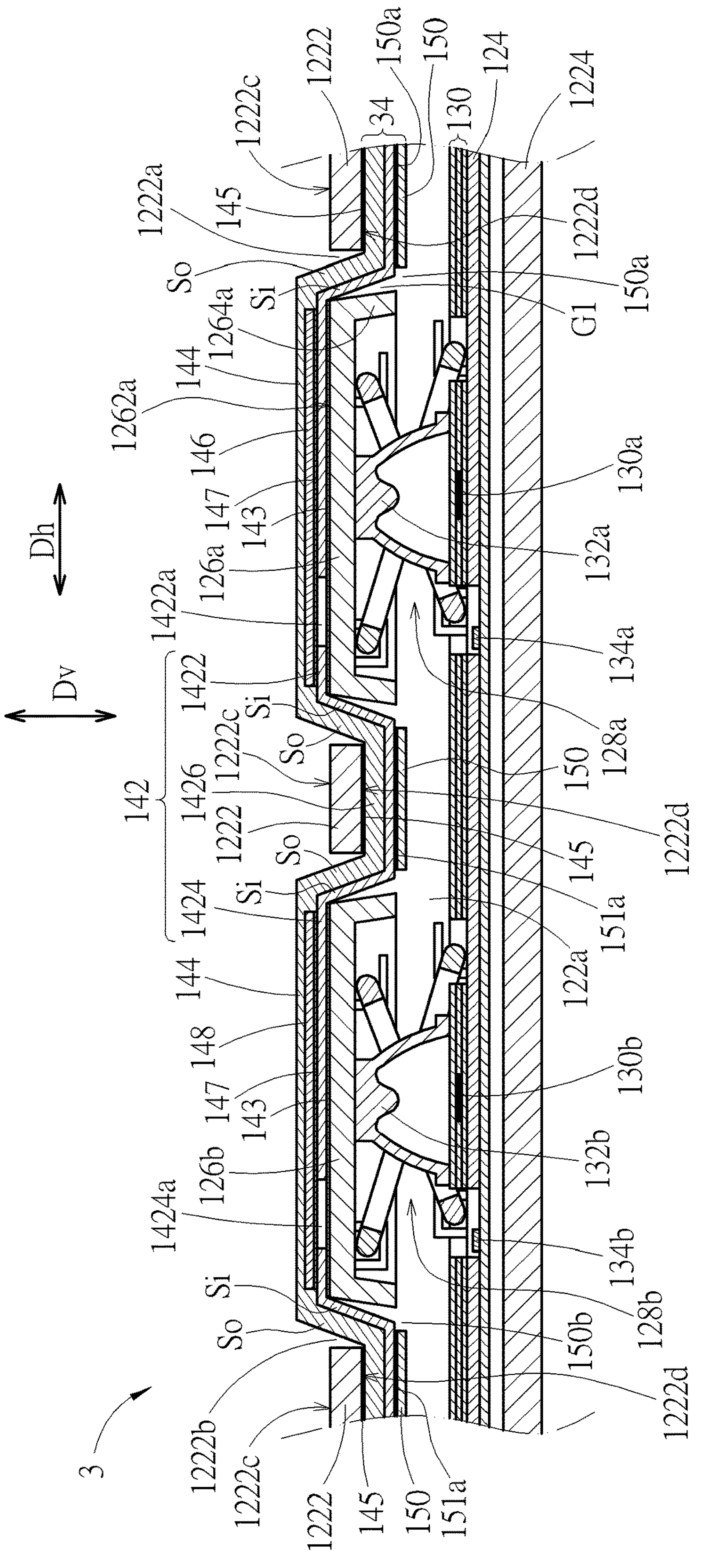
FIG. 7 is a sectional view of the keyboard in FIG. 6 along the line Y-Y.

Furthermore, in the first embodiment, the multilayer structure 14 covers the upper casing 1222; however, it is not limited thereto in practice. For example, as shown by FIG. 6 and FIG. 7, a keyboard 3 according to a second embodiment is structurally similar to the keyboard 1, so the keyboard 3 uses the reference numbers of the keyboard 1 in practice. In the keyboard 3, the multilayer structure 34 covers the plurality of keycap and is fixed on an inner surface 1222*d* of the upper casing 1222; that is, the multilayer structure 34 is disposed in the device casing 122 and the portions thereof corresponding to the keycaps are exposed or protrudes from the upper casing 1222. For example, the first keycap portion 1422 protrudes from the first window 1222*a*, the second keycap portion 1424 protrudes from the second window 1222*b*, and the connection portion 1426 is located under the upper casing 1222. Therein, the multilayer structure 34 adheres to the inner surface 1222*d* through the adhesive layer 145 of the flexible light-transmissive layer 144; however, it is not limited thereto. For example, the portion of the multilayer structure 34 located in the accommodating space 122*a* may be clamped by the upper casing 1222 and the lower casing 1224 (e.g. by using a upwardly-protruding structure disposed on the lower casing 1224 to abut against the multilayer structure 34), which also can achieve the effect of fixing the multilayer structure 34 and the device casing 122. For another example, in the multilayer structure 34, the rigid frame sheet 150 is disposed on the flexible light-transmissive layer 144 alternatively. The modified multilayer structure 34 may be fixed to inner surface 1222*d* through the rigid frame sheet 150 (similarly, which may be achieved by means of glue).

Figure 8:
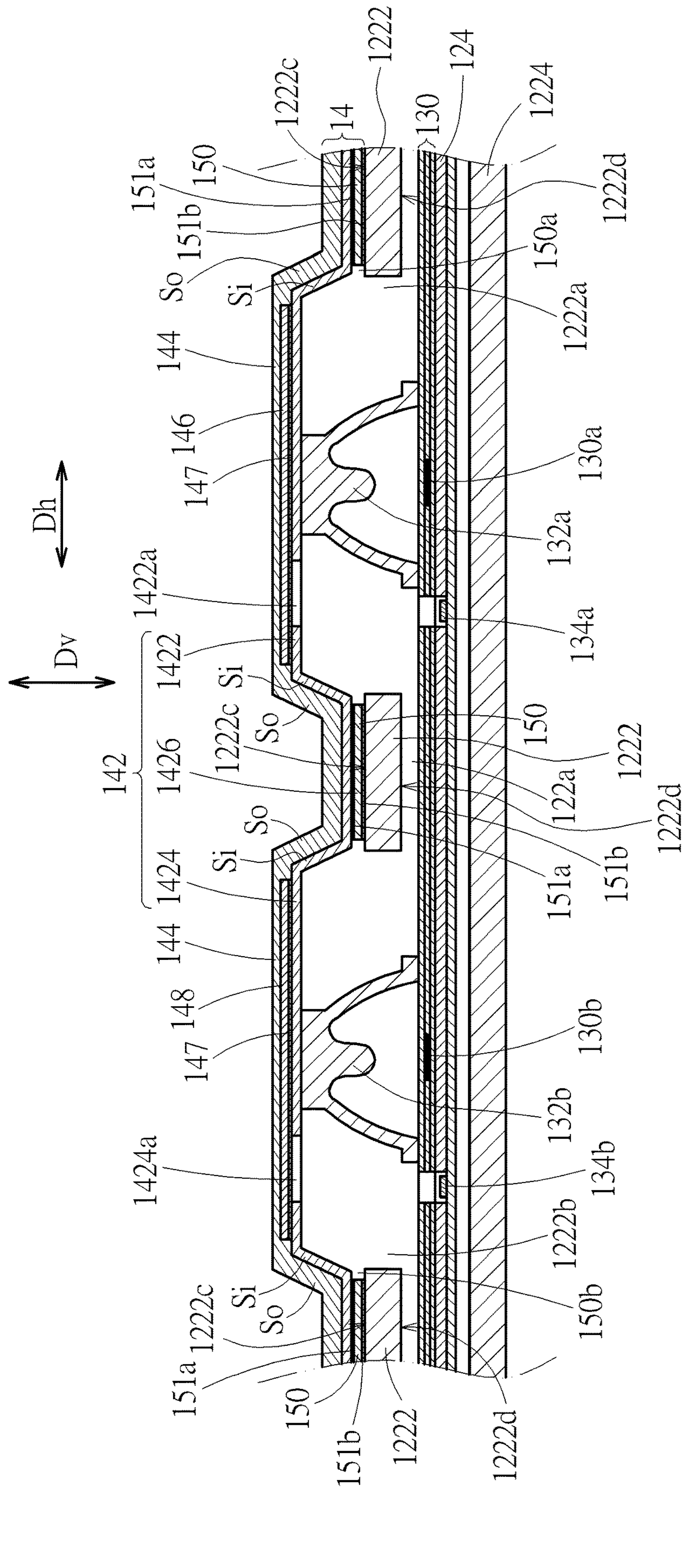
FIG. 8 is a sectional view of a variant of the keyboard in FIG. 4.
Figure 9:
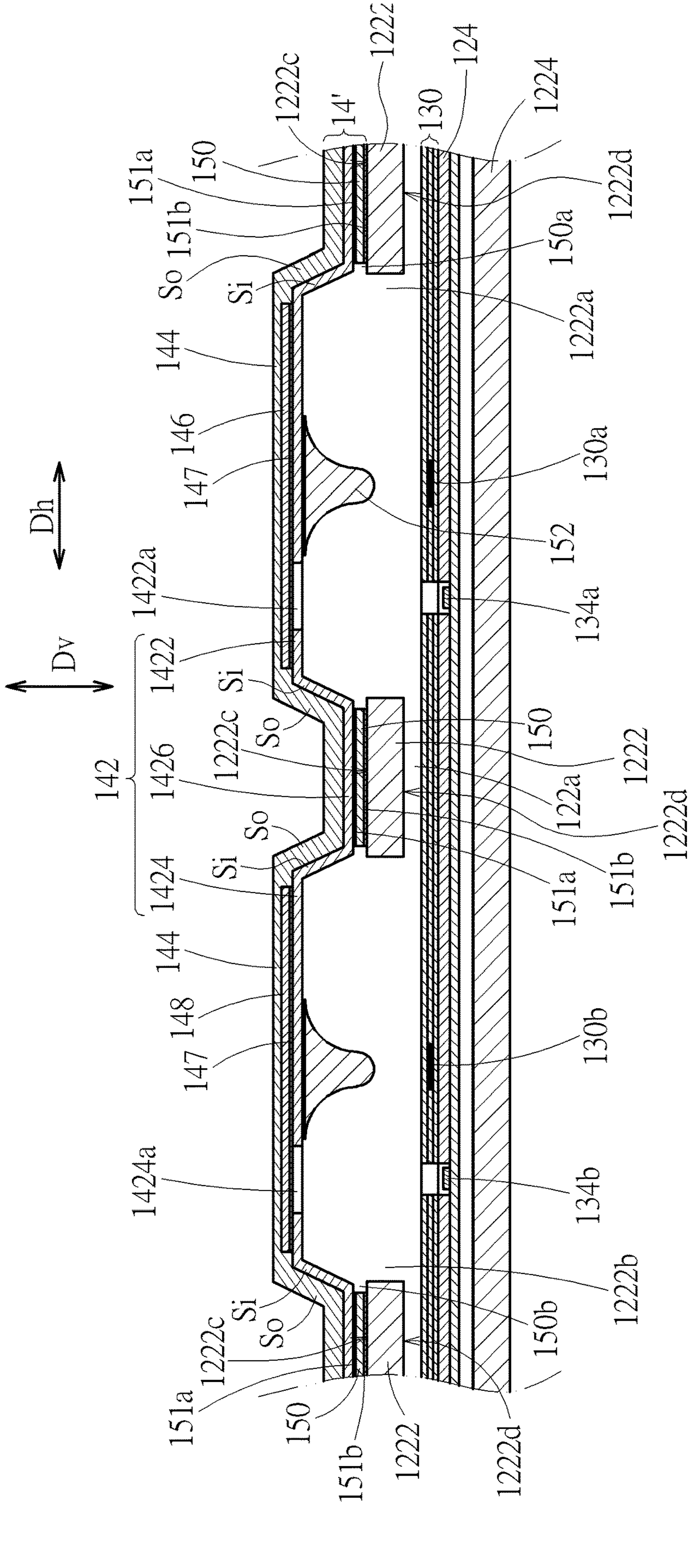
FIG. 9 is a sectional view of a variant of the keyboard in FIG. 4.

Furthermore, in the first embodiment, the keycap (e.g. the first keycap 126*a*) is supported by a lift mechanism (e.g. the first lift mechanism 128*a*) and a resilient restoration part (e.g. the first resilient restoration part 132*a*); however, it is not limited thereto in practice. For example, the first keycap 126*a* is supported only by the first resilient restoration part 132*a*. For another example, if the multilayer structure 14 itself can maintain the shape of the keycap (for example, the first rigid light-transmissive cover sheet 146 can increase the structural rigidity), the can be further omitted so that the first resilient restoration part 132*a* directly abuts the first keycap portion 1422, as shown by FIG. 8. For another example, if the multilayer structure 14 can provide sufficient structural flexibility, the first resilient restoration part 132*a* can be further omitted, as shown by FIG. 9. In this instance, the multilayer structure 14' is a variant of the multilayer structure 14 of the above keyboard 1. Compared with the multilayer structure 14, the multilayer structure 14' further includes a protrusion 152 which protrudes toward the first switch 130*a*. When the portion of the multilayer structure 14' corresponding to the first keycap portion 1422 is pressed, the protrusion 152 moves downward to trigger the first switch 130*a*. In practice, the protrusion 152 may be fixed to the inner flexible layer 142 by means of glue, or the protrusion 152 is structurally integrated into the inner flexible layer 142. For example, the inner flexible layer 142 is shaped by hot-pressing to form the protrusion 152.

Figure 10:
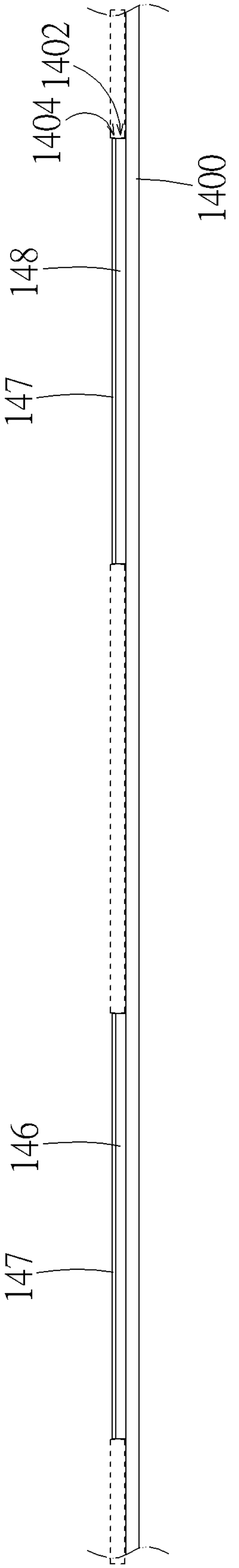
FIG. 10 is a sectional diagram illustrating a layered structure for forming the multilayer structure in FIG. 2.

In addition, in the keyboard 1, the multilayer structure 14 may be formed by, but not limited to, laminating sheet materials and shaping in practice. For example, as shown by FIG. 10 (in which the cross section is not hatched for simplification of drawing), a transfer film 1400 is prepared. The transfer film 1400 carries a light-transmissive film 1402 used for forming the first rigid light-transmissive cover sheet 146 and the second rigid light-transmissive cover sheet 148. Then, an adhesive layer 1404 used for forming the adhesive layer 147 is formed on the light-transmissive film 1402 (e.g. by hot melt glue, double-sided glue, or other glues). The light-transmissive film 1402 (and the adhesive layer 1404 thereon) is processed to form the first rigid light-transmissive cover sheet 146 and the second rigid light-transmissive cover sheet 148 (in which the adhesive layer 1404 after processed forms the adhesive layer 147), e.g. by removing unnecessary portions (indicated by dashed frames in the figure) through laser.

Figure 11:
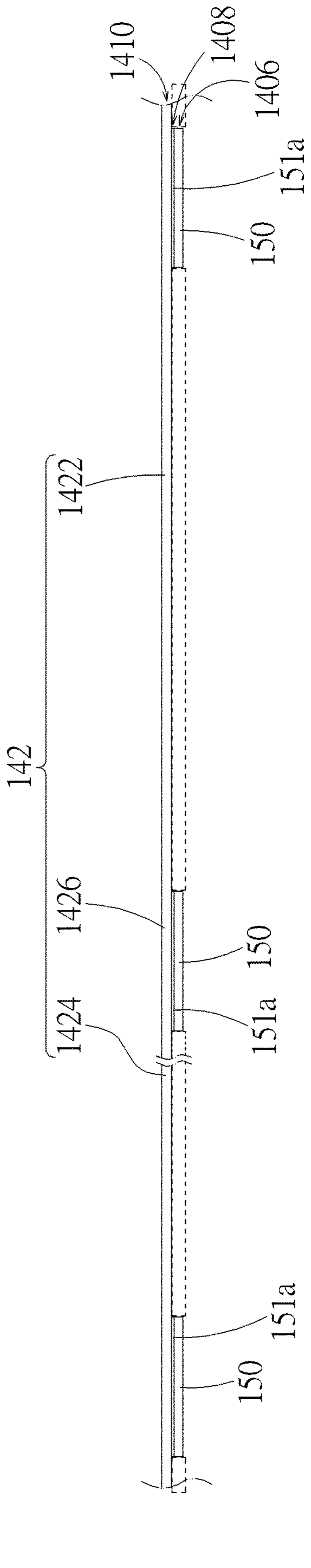
FIG. 11 is a sectional diagram illustrating another layered structure for forming the multilayer structure in FIG. 2.

As shown by FIG. 11 (in which the cross section is not hatched for simplification of drawing), a film 1406 used for forming the rigid frame sheet 150 is prepared. An adhesive layer 1408 (e.g. by hot melt glue, double-sided glue, or other glues) used for forming the adhesive layer 151*a* is formed on the film 1406. A film 1410 used for forming the inner flexible layer 142 adheres to the adhesive layer 1408. Therein, the film 1406 (together with the adhesive layer 1408) may be processed first to form the rigid frame sheet 150 (e.g. by punching to remove unnecessary portions which are indicated by dashed frames in the figure). Then, a film 1410 adheres to the adhesive layer 1408. Alternatively, after the film 1410 adheres to the adhesive layer 1408, the combination is processed to form the rigid frame sheet 150 (e.g. by using laser to remove unnecessary portions which are indicated by dashed frames in the figure).

Figure 12:
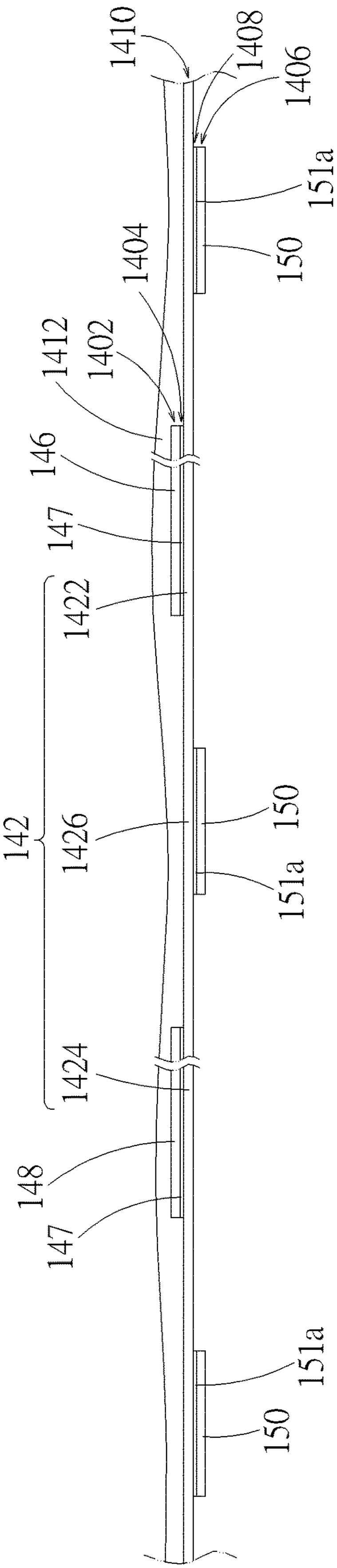
FIG. 12 is a sectional diagram illustrating the combination of the layered structures in FIG. 10 and FIG. 11.
Figure 13:
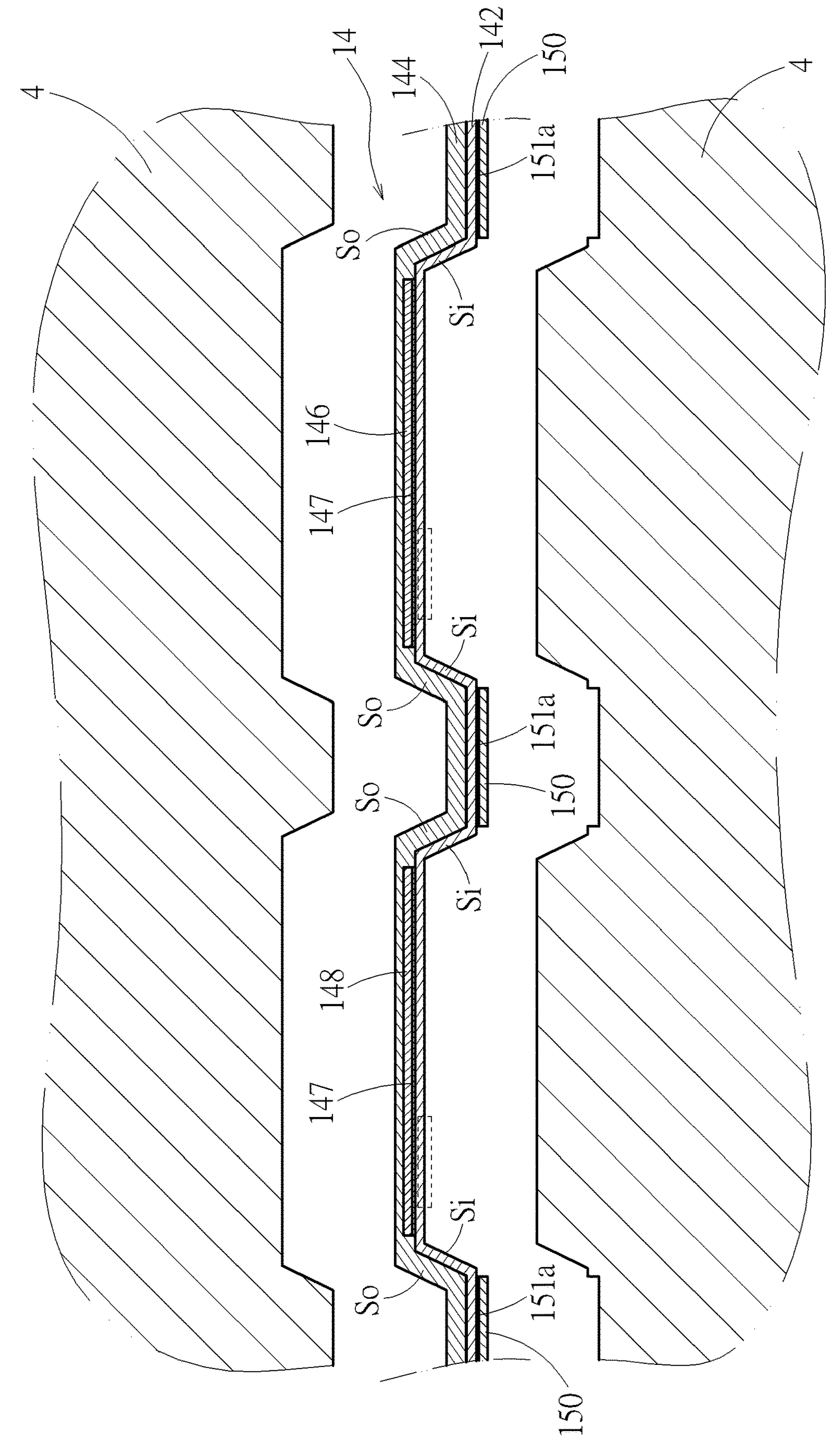
FIG. 13 is a sectional diagram illustrating the combination of the layered structures in FIG. 12 when being shaped.

As shown by FIG. 12 (in which the cross section is not hatched for simplification of drawing), after the layered structures in FIG. 10 and FIG. 11 are joined through the adhesive layer 1404, the transfer film 1400 is removed. Then, a layer of glue 1412 is coated on the combination of the layered structures (i.e. the first rigid light-transmissive cover sheet 146 and the second rigid light-transmissive cover sheet 148 thereof). As shown by FIG. 13, the structure in FIG. 12 is placed in a shaping mold 4 and then is compressed and heated (e.g. 120 degrees Celsius for 120 seconds) through the shaping mold 4 to form the flexible light-transmissive layer 144. At this moment, the shaped layered structure has carried out most of the multilayer structure 14. Then, the first keycap portion 1422 and the second keycap portion 1424 (formed by the film 1410) in the shaped layered structure is processed by laser engraving (on the portions indicated by dashed frames in FIG. 13) to form the first spatial character structure 1422*a* and the second spatial character structure 1424*a*. Therein, in practice, the glue 1412 may be formed on the bonded layered structures in FIG. 12 by injection, e.g. through the shaping mold 4 that is made into an injection mold. In addition, in the keyboard 1, the multilayer structure 14 is fixed on the outer surface 1222*c* of the upper casing 1222, so the adhesive layer 151*b* is formed on the rigid frame sheet 150 of the multilayer structure 14 that is shaped through the shaping mold 4, so as to adhere to the outer surface 1222*c*. Or, the adhesive layer 151*b* is formed on the outer surface 1222*c* alternatively, for the rigid frame sheet 150 to adhere thereto. Similarly, the adhesive layer 143 is formed on the surface, toward the keycap, of the inner flexible layer 142 of the multilayer structure 14 that is shaped through the shaping mold 4, so as to adhere to the first keycap 126*a* and the second keycap 126*b*. Or, the adhesive layer 143 is formed on the first keycap 126*a* and the second keycap 126*b* alternatively, for the inner flexible layer 142 to adhere thereto. Furthermore, the above multilayer structures 14' and 34 can also be made in a similar manner, which will not be described in addition.

As described above, when the user presses the keycap, the user's finger actually touches the portion of the multilayer structure (or the flexible light-transmissive layer) corresponding to the keycap. Even during the pressing process, the finger may rub the multilayer structure. Under the protection of the rigid light-transmitting cover sheet, the spatial character structure will not be affected by the rubbing of the finger, at least greatly reducing structural damage to the spatial character structure (including structural deformation of the first spatial character structure) caused by rubbing of the finger.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyswitch structure, comprising:

a first switch; and a multilayer structure, disposed above the first switch, the multilayer structure comprising:

an inner flexible layer, having a first keycap portion and a connection portion extending outward from the first keycap portion, the first keycap portion being located above the first switch and forming a first spatial character structure;

a first rigid light-transmissive cover sheet, disposed on the first keycap portion and covering the first spatial character structure; and a flexible light-transmissive layer, covering the inner flexible layer and the first rigid light-transmissive cover sheet;

wherein the inner flexible layer has an inner skirt portion, the flexible light-transmissive layer has an outer skirt portion, both of the inner skirt portion and the outer skirt portion surround at least two opposite sides of the first rigid light-transmissive cover sheet, and both of the inner skirt portion and the outer skirt portion extend downward with the outer skirt portion covering the inner skirt portion.

2. The keyswitch structure according to claim 1, further comprising a first keycap, disposed above the first switch and under the multilayer structure, wherein the first keycap portion covers the first keycap, and the first keycap moves in a vertical direction toward the first switch to trigger the first switch.

3. The keyswitch structure according to claim 2, wherein the first keycap has a horizontal keycap surface, the first keycap portion is fixed on the horizontal keycap surface, and a projection of the first rigid light-transmissive cover sheet on the first keycap in the vertical direction is within the horizontal keycap surface.

4. The keyswitch structure according to claim 3, wherein the first keycap has a keycap fringe, the keycap fringe bends downward and extends from the horizontal keycap surface, and the multilayer structure and the keycap fringe are separable.

5. The keyswitch structure according to claim 4, wherein when first keycap is not pressed, there is a gap between the first keycap portion and the keycap fringe in a horizontal direction.

6. The keyswitch structure according to claim 1, wherein the multilayer structure comprises a protrusion that protrudes toward the first switch, and a portion of the multilayer structure corresponding to the first keycap portion is pressed to move the protrusion downward to trigger the first switch.

7. The keyswitch structure according to claim 1, further comprising a resilient restoration part, disposed between the first keycap portion and the first switch, wherein a portion of the multilayer structure corresponding to the first keycap portion is pressed, so that the multilayer structure touches and squeezes the resilient restoration part to trigger the first switch.

8. The keyswitch structure according to claim 1, wherein the connection portion surrounds the first keycap portion.

9. The keyswitch structure according to claim 1, wherein the multilayer structure comprises a rigid frame sheet, the rigid frame sheet has a first through hole, the connection portion is fixed on the rigid frame sheet, and a projection of the first keycap portion on the rigid frame sheet in a vertical direction is within the first through hole.

10. The keyswitch structure according to claim 1, further comprising a second switch, wherein the inner flexible layer has a second keycap portion, the connection portion connects the first keycap portion and the second keycap portion, the second keycap portion is located above the second switch and forms a second spatial character structure, the multilayer structure comprises a second rigid light-transmissive cover sheet disposed on the second keycap portion and covering the second spatial character structure, the flexible light-transmissive layer covers the second rigid light-transmissive cover sheet, the rigid frame sheet has a second through hole, and a projection of the second keycap portion on the rigid frame sheet in the vertical direction is within the second through hole.

11. The keyswitch structure according to claim 1, further comprising a structural frame, wherein the structural frame has a first window, the multilayer structure is fixed to the structural frame, and a projection of the first keycap portion on the structural frame in a vertical direction is within the first window.

12. The keyswitch structure according to claim 11, further comprising a second switch, wherein the inner flexible layer has a second keycap portion, the connection portion connects the first keycap portion and the second keycap portion, the second keycap portion is located above the second switch and forms a second spatial character structure, the multilayer structure comprises a second rigid light-transmissive cover sheet disposed on the second keycap portion and covering the second spatial character structure, the flexible light-transmissive layer covers the second rigid light-transmissive cover sheet, the structural frame has a second window, and a projection of the second keycap portion on the structural frame in the vertical direction is within the second window.

13. The keyswitch structure according to claim 1, wherein the inner flexible layer is made of an opaque material.

14. The keyswitch structure according to claim 1, wherein the first spatial character structure is a holed structure.

15. A keyboard, comprising:

a keyswitch structure; and a device casing, carrying the keyswitch structure;

wherein the keyswitch structure comprises:

- a first switch; and
- a multilayer structure, disposed above the first switch and fixed to the device casing, the multilayer structure comprising:
  - an inner flexible layer, having a first keycap portion and a connection portion extending outward from the first keycap portion, the first keycap portion being located above the first switch and forming a first spatial character structure;
  - a first rigid light-transmissive cover sheet, disposed on the first keycap portion and covering the first spatial character structure; and
  - a flexible light-transmissive layer, covering the inner flexible layer and the first rigid light-transmissive cover sheet;

wherein the inner flexible layer has an inner skirt portion, the flexible light-transmissive layer has an outer skirt portion, both of the inner skirt portion and the outer skirt portion surround at least two opposite sides of the first rigid light-transmissive cover sheet, and both of the inner skirt portion and the outer skirt portion extend downward with the outer skirt portion covering the inner skirt portion.

16. The keyboard according to claim 15, wherein the device casing comprises an upper casing and a lower casing, the upper casing and the lower casing are connected to form an accommodating space, the first switch is disposed in the accommodating space, the upper casing has a first window, a projection of the first keycap portion on the upper casing in a vertical direction is within the first window, and the multilayer structure is fixed to an outer surface of upper casing.

17. The keyboard according to claim 16, further comprising a lower flexible layer, wherein the multilayer structure is located above the upper casing, the lower flexible layer is located under the lower casing, and the multilayer structure is joined with the lower flexible layer to encapsulate the device casing.

18. The keyboard according to claim 15, wherein the device casing comprises an upper casing and a lower casing, the upper casing and the lower casing are connected to form an accommodating space, the first switch is disposed in the accommodating space, the upper casing has a first window, a projection of the first keycap portion on the upper casing in a vertical direction is within the first window, and the multilayer structure is fixed to an inner surface of the upper casing.

19. The keyboard according to claim 15, wherein the multilayer structure comprises a rigid frame sheet, the rigid frame sheet has a first through hole, the connection portion is fixed on the rigid frame sheet, and a projection of the first keycap portion on the rigid frame sheet in a vertical direction is within the first through hole.

20. The keyboard according to claim 15, wherein the device casing forms an accommodating space and has first and second windows communicating with the accommodating space, the keyswitch structure comprises a second switch, the first and second switches are disposed in the accommodating space corresponding to the first and second windows respectively, the inner flexible layer has a second keycap portion above the second switch, the connection portion connects the first and second keycap portions and surrounds the first keycap portion, a projection of the first keycap portion in a vertical direction is within the first window, and a projection of the second keycap portion in the vertical direction is within the second window.

* * * * *